(12) United States Patent
Saxena et al.

(10) Patent No.: US 9,705,306 B2
(45) Date of Patent: Jul. 11, 2017

(54) NON-ISOLATED POWER SUPPLY OUTPUT CHASSIS GROUND FAULT DETECTION AND PROTECTION SYSTEM

(71) Applicant: HONEYWELL INTERNATIONAL INC., Morristown, NJ (US)

(72) Inventors: Sunit Kumar Saxena, Karnataka (IN); Deepak Bhimrao Mahajan, Karnataka (IN); Tarak Saha, West Bengal (IN); Anand Vivek Ravi, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 335 days.

(21) Appl. No.: 14/521,688

(22) Filed: Oct. 23, 2014

(65) Prior Publication Data

US 2016/0118784 A1    Apr. 28, 2016

(51) Int. Cl.
*H02H 3/08* (2006.01)
*H02M 3/04* (2006.01)
(Continued)

(52) U.S. Cl.
CPC ............ *H02H 3/08* (2013.01); *H02M 1/32* (2013.01); *H02M 3/04* (2013.01); *H02M 3/1582* (2013.01)

(58) Field of Classification Search
CPC ............ H02H 3/08; H02M 1/32; H02M 3/04; H02M 3/1582
(Continued)

(56) References Cited

U.S. PATENT DOCUMENTS 6,804,094 B2 * 10/2004 Kampmeyer ............ H02H 3/33
361/101
8,040,139 B2  10/2011 Plagens et al.
(Continued)

FOREIGN PATENT DOCUMENTS

JP     2000224761 A    8/2000
WO    2013163777 A1   11/2013

OTHER PUBLICATIONS

Shiji H, et al.; A Zero-Voltage-Switching Bidirectional Converter for PV Systems; INTELEC 2003; 25th International Telecommunications Energy Conference, Yokohama, Japan Oct. 19-23, 2003.
(Continued)

*Primary Examiner* — Thienvu Tran
*Assistant Examiner* — Kevin J Comber
(74) *Attorney, Agent, or Firm* — Lorenz & Kopf, LLP

(57) ABSTRACT

A non-isolated power supply is configured to receive an input voltage and supply an output voltage, and includes a supply line, a return line, a first semiconductor switch coupled in series in the supply line, and a second semiconductor switch coupled in series in the return line. The first and second semiconductor switches are each configured to operate in an ON state and an OFF state. The differential current sensor is configured to sense differential current between the supply line and the return line. The fault detection logic is coupled to the differential current sensor, the first semiconductor switch, and the second semiconductor switch, and is configured to detect when the differential current exceeds a predetermined current magnitude, and command the first and second semiconductor switches to operate in the OFF state upon detecting that the differential current exceeds the predetermined current magnitude.

19 Claims, 3 Drawing Sheets

(51) Int. Cl.
*H02M 1/32* (2007.01)
*H02M 3/158* (2006.01)

(58) Field of Classification Search
USPC .......................................................... 361/101
See application file for complete search history.

(56) References Cited

U.S. PATENT DOCUMENTS

| | | |
|---|---|---|
| 8,400,076 B2 | 3/2013 | Chan et al. |
| 8,635,033 B2 | 1/2014 | Hasan et al. |
| 2012/0307526 A1 | 12/2012 | Senanayake |

OTHER PUBLICATIONS

Extended EP Search Report for Application No. 15191114.6-1809 dated Mar. 22, 2016.

* cited by examiner

NON-ISOLATED POWER SUPPLY OUTPUT CHASSIS GROUND FAULT DETECTION AND PROTECTION SYSTEM

TECHNICAL FIELD

The present invention generally relates to non-isolated power supplies, and more particularly relates to a system for detection and protection of chassis ground faults in non-isolated power supply topologies.

BACKGROUND

In recent years, various industrial and technology sectors, including aerospace, industrial, medical, and municipal, are turning to LED based lighting systems as alternatives to existing lighting solutions. This is due, at least in part, to the fact that LEDs can offer very high luminous intensity, which can be controlled over a wide range with suitable power conversion and driver circuit. Moreover, LEDs are relatively small and relatively more reliable.

Many power supply topologies may be used to drive and control the luminous intensity of LEDs. A vast majority of the proposed topologies are powered from an AC source, and thus rely on a power factor corrected (PFC) AC-DC converter at the front end. One common PFC AC-DC converter topology that is used is the boost converter because it performs well at medium to high power levels. However, one downside of this topology is that the output voltage needs to be higher than the AC source peak voltage, thus necessitating, in most applications, another DC-DC converter, a buck converter, in order to reduce the voltage level used to drive the LEDs. Adding isolation in the downstream DC-DC converter is possible but it negatively impacts overall system efficiency, size, and weight. Hence, the non-isolated, two-stage boost and buck power supply is the preferred topology for medium power LED applications, such as aircraft applications. This, as will now be explained, can present certain drawbacks in the aircraft environment.

In aircraft electrical power systems, the AC return is tied to chassis. Thus, in the unlikely event the LED side of the above-described non-isolated power supply was to become shorted to chassis, the source finds a low impedance path through the short and the controller goes out of bounds, resulting in the power supply potentially being damaged. The conventional technique that is used to protect a non-isolated power supply is to measure both the high side (supply line) and low side (return line) current, and turn-off the buck converter gate driver when the differential current exceeds a predetermined limit. The presently used techniques are not sufficiently fast, and will not be able to protect against the ground fault condition, even with existing differential current monitoring and protection techniques, thus potentially damaging the power supply.

Hence, there is a need for a system to detect a non-isolated power supply output-to-chassis short, and protect the non-isolated power supply from the detected short to prevent damage to the power supply. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a circuit includes a non-isolated power supply, a differential current sensor, and fault detection logic. The non-isolated power supply is configured to receive an input voltage and supply an output voltage, and includes a supply line, a return line, a first semiconductor switch coupled in series in the supply line, and a second semiconductor switch coupled in series in the return line. The first and second semiconductor switches are each configured to operate in an ON state, in which electrical current flows through the first and second semiconductor switches, and an OFF state, in which electrical current does not flow through the first and second semiconductor switches. The differential current sensor is configured to sense differential current between the supply line and the return line. The fault detection logic is coupled to the differential current sensor, the first semiconductor switch, and the second semiconductor switch, and is configured to: detect when the differential current exceeds a predetermined current magnitude, and command the first and second semiconductor switches to operate in the OFF state upon detecting that the differential current exceeds the predetermined current magnitude.

In another embodiment, a non-isolated power supply includes a DC-DC converter, a differential current sensor, a return line current sensor, and fault detection logic. The DC-DC converter is adapted to receive an input DC voltage and supply an output DC voltage. The DC-DC converter includes a boost stage, a buck stage, a supply line, a return line, a first semiconductor switch coupled in series in the supply line, and a second semiconductor switch coupled in series in the return line. The first and second semiconductor switches are each configured to operate in an ON state, in which electrical current flows through the first and second semiconductor switches, and an OFF state, in which electrical current does not flow through the first and second semiconductor switches. The differential current sensor is configured to sense differential current between the supply line and the return line. The return line current sensor is configured to sense return line current. The fault detection logic is coupled to the differential current sensor, the return line current sensor, the first semiconductor switch, and the second semiconductor switch, and is configured to: detect when the differential current exceeds a predetermined current magnitude, detect when return line current exceeds a predetermined return line current value, and command the first and second semiconductor switches to operate in the OFF state upon detecting that (i) the differential current exceeds the predetermined current magnitude or (ii) the return line current exceeds the predetermined current value.

In yet another embodiment, a non-isolated power supply includes a DC-DC converter, a differential current sensor, a return line current sensor, fault detection logic. The DC-DC converter is adapted to receive an input DC voltage and supply an output DC voltage, and includes a supply line, a return line, a first semiconductor switch coupled in series in the supply line, and a second semiconductor switch coupled in series in the return line. The first and second semiconductor switches are each configured to operate in an ON state, in which electrical current flows through the first and second semiconductor switches, and an OFF state, in which electrical current does not flow through the first and second semiconductor switches. The differential current sensor is configured to sense differential current between the supply line and the return line, and comprises a Hall sensor. The return line current sensor is configured to sense return line current, and comprises a resistance coupled in series in the return line. The fault detection logic is coupled to the differential current sensor, the return line current sensor, the first semiconductor switch, and the second semiconductor switch. The fault detection logic includes a first comparator, a second comparator, and OR-logic. The first comparator is configured to detect when the differential current exceeds a predetermined current magnitude and supply a first output signal representative thereof. The second comparator is configured to detect when the return line current exceeds the predetermined current value and supply a second output signal representative thereof. The OR-logic is coupled to the first and second comparators and is configured, upon receipt of one or both of the first and second output signals, to command the first and second semiconductor switches to operate in the OFF state.

Furthermore, other desirable features and characteristics of the non-isolated power supply protection system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
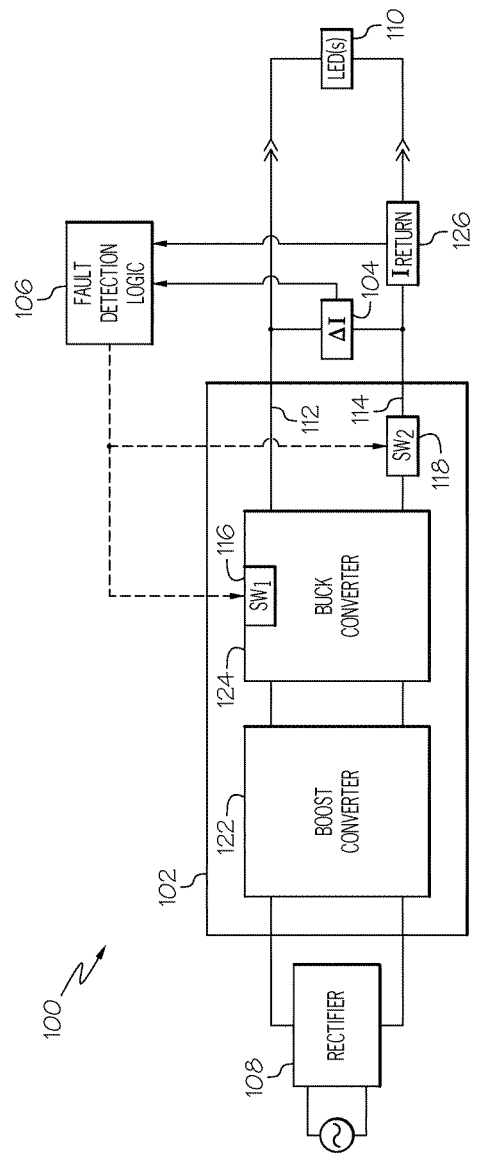
FIG. 1 depicts a functional block diagram of one embodiment of a non-isolated power supply.

Referring now to FIG. 1, a functional block diagram of one embodiment of a circuit. The depicted circuit includes a non-isolated power supply and a system for detecting and protecting the power supply from an output-to-chassis ground fault is depicted. The depicted non-isolated power supply 100 includes a DC-DC converter 102, a differential current sensor 104, and fault detection logic 106. The DC-DC converter 102 is coupled to receive an input DC voltage, such as a full-wave rectified voltage, and is configured, upon receipt thereof to supply an output DC voltage to a load, such as one or more LEDs 110. In the depicted embodiment the input DC voltage is supplied from a full-wave rectifier circuit 108 that receives an AC voltage and is configured, upon receipt thereof, to supply the full-wave rectified input DC voltage to the DC-DC converter 102. The AC voltage may be implemented using anyone of numerous AC supplies, such as, for example, a 115 VAC supply system in an aircraft.

The DC-DC converter 102 includes a supply line 112, a return line 114, a first semiconductor switch 116 coupled in series in the supply line 112, and a second semiconductor switch 118 coupled in series in the return line 114. The DC-DC converter 102 may be variously configured and implemented, but in the depicted embodiment it includes a boost converter 122 and a buck converter 124. As is generally known, the boost converter 122 receives the input DC voltage and is configured, upon receipt thereof, to supply a boosted DC voltage to the buck converter 124. The buck converter 124, which includes the first semiconductor switch 116, is configured, upon receipt of the boosted DC voltage, to supply the output DC voltage to the load 110.

Figure 2:
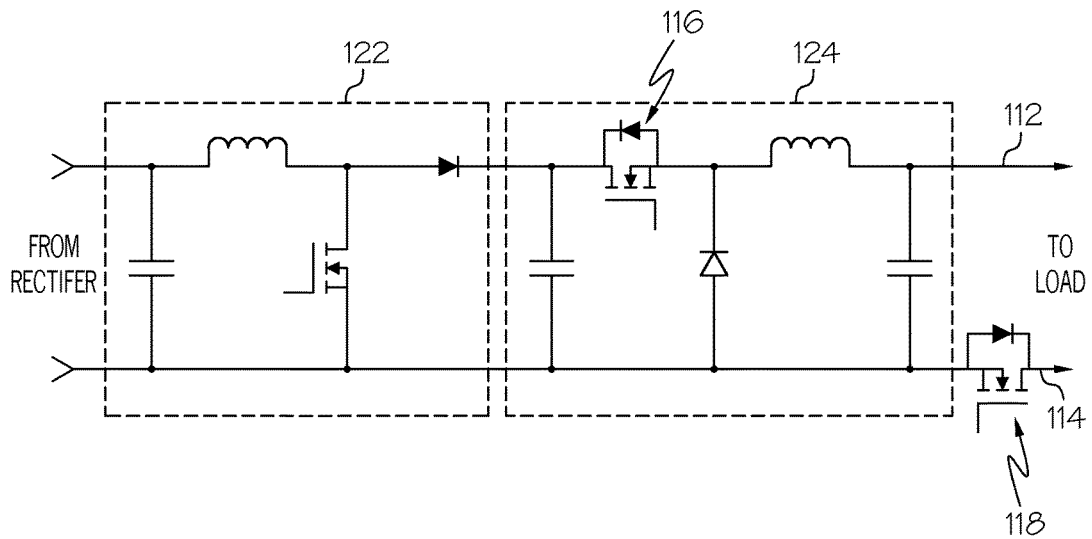
FIG. 2 depicts a detailed schematic representation of a DC-DC converter that may be used to implement the non-isolated power supply of FIG. 1.

For completeness, a more detailed schematic representation of one embodiment of the DC-DC converter 102, more clearly illustrating the configurations of the boost converter 122 and buck converter 124, is shown in FIG. 2. As FIG. 2 depicts, the first and second semiconductor switches 116, 118 each comprise transistors, such as, MOSFETs or IGBTs. Regardless of how the first and second semiconductor switches 116, 118 are specifically implemented, each is configured to operate in an ON state and an OFF state. In the ON state, electrical current flows through the first and second semiconductor switches 116, 118, and in the OFF state electrical current does not flow through the first and second semiconductor switches 116, 118.

Before proceeding further, it is noted that semiconductor switch 116 and semiconductor switch 118 may be variously disposed in the circuit. More specifically, in some embodiments semiconductor switch 116 is coupled in series in the return line 114, and semiconductor switch 118 is coupled in series in the supply line 112.

Returning now to the description and with reference once again to FIG. 1, it is seen that the differential current sensor 104 is coupled to the supply line 112 and the return line 114. The differential currents sensor 104 is configured to sense the differential current between the supply line 112 and the return line 114, and supplies a signal representative of the sensed differential current to the fault detection logic 106. It will be appreciated that the differential current sensor 104 may be variously configured and implemented, but in a particular preferred embodiment it is implemented using a Hall sensor.

As FIG. 1 also illustrates, the depicted non-isolated power supply 100 also includes a return line current sensor 126, though in some embodiments the non-isolated power supply 100 may be implemented without the return line current sensor 126. The return line current sensor 126 is configured to sense return line current and supply a signal representative thereof to the fault detection logic 106. It will be appreciated that the return line current sensor 126 may be variously configured and implemented, but in a particular preferred embodiment it is implemented using a resistance that is coupled in series between the load 110 and the return line 114. It will additionally be appreciated that in some embodiments the non-isolated power supply 100 may be implemented without the return line current sensor 126.

The fault detection logic 106 is coupled to the differential current sensor 104, the first semiconductor switch 116, and the second semiconductor switch 118. The fault detection logic 106 is configured to detect when the differential current exceeds a predetermined current magnitude, and command the first and second semiconductor switches 116, 118 to operate in the OFF state upon detecting that the differential current exceeds the predetermined current magnitude. In those embodiments that also include the return line current sensor 126, the fault detection logic 106 is additionally coupled to the return line current sensor 126, and is further configured to detect when return line current exceeds a predetermined current value, and command the first and second semiconductor switches 116, 118 to operate in the OFF state upon detecting that the return line current exceeds the predetermined current value.

Figure 3:
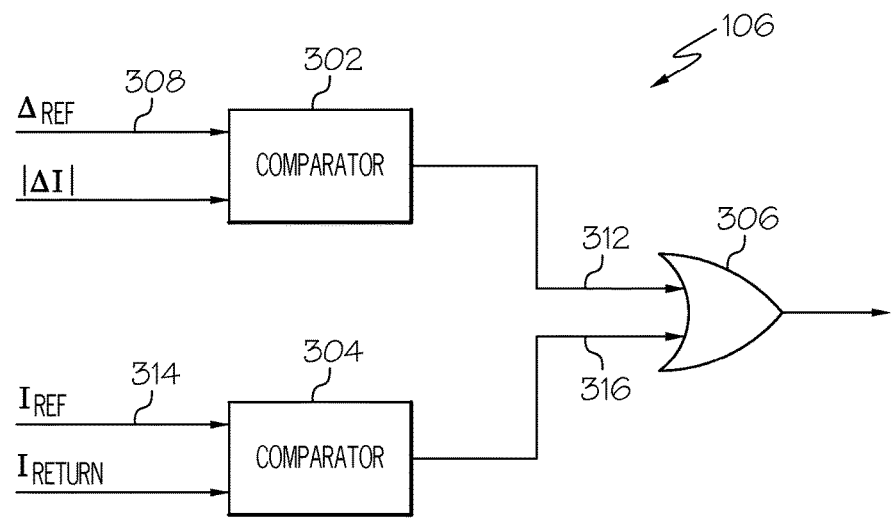
FIG. 3 depicts a functional block diagram of one embodiment of fault detection logic that may be used to implement the non-isolated power supply of FIG. 1.

The fault detection logic 106 may be variously configured to implement the above described functionality, but in one embodiment, which is depicted in FIG. 3, the fault detection logic 106 includes a first comparator 302, a second comparator 304, and OR-logic 306. The first comparator 302 is configured to detect when the differential current exceeds the predetermined current magnitude 308 and supply a first output signal 312 representative thereof. In particular, the first comparator 302 is preferably configured such that the first output signal 312 is a logic LOW when the differential current does not exceed the predetermined current magnitude 308, and is a logic HIGH when the differential current exceeds the predetermined current magnitude 308.

The second comparator 304 is configured to detect when the return line current exceeds the predetermined current value 314 and supply a second output signal 316 representative thereof. In particular, the second comparator 304 is preferably configured such that the second output signal 316 is a logic LOW when the return line current does not exceed the predetermined current value 314, and is a logic HIGH when the return line current exceeds the predetermined current value 314.

The OR-logic 306 is coupled to the first and second comparators 302, 304 and is configured, upon receipt of one or both of the first and second output signals 312, 316 at a logic HIGH state, to command the first and second semiconductor switches 116, 118 to operate in the OFF state.

By including the second semiconductor switch 118 in the return line 114, the non-isolated power supply 100 depicted in FIGS. 1 and 2 is protected from output-to-chassis short under all input supply conditions. In the event an output-to-chassis short were to occur, the first and second semiconductor switches 116, 118 will be commanded to operate in the OFF state, even during the negative half-cycle of the AC voltage. This is because the body diode of the second semiconductor switch 118 will block current flow during the negative half-cycle of the AC voltage. Moreover, because a single differential current sensor 104 is used, a phase error, which result in nuisance trips, and which may occur when two separate current sensors are used to sense differential current, is eliminated.

Figure 4:
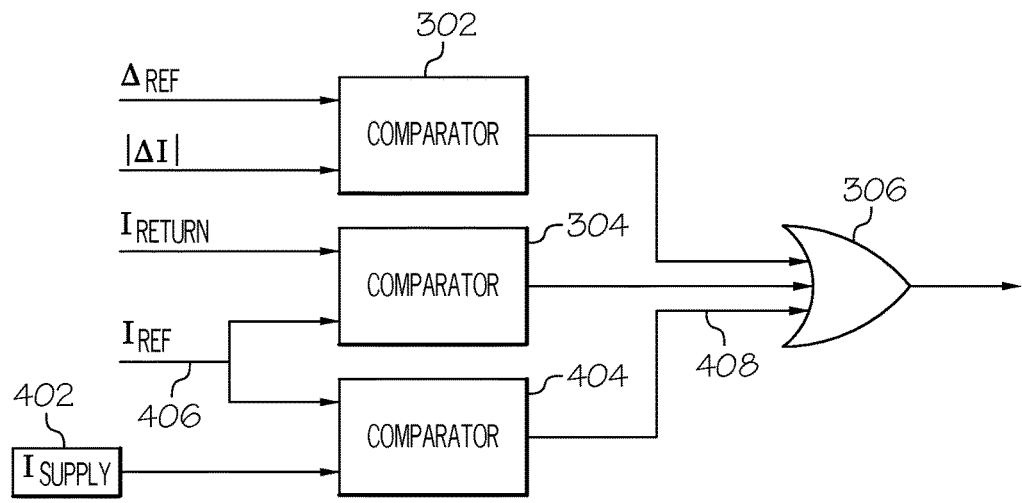
FIGS. 4-6 depict functional block diagrams of alternative embodiments of the fault detection logic that may be used to implement the non-isolated power supply of FIG. 1.
Figure 5:
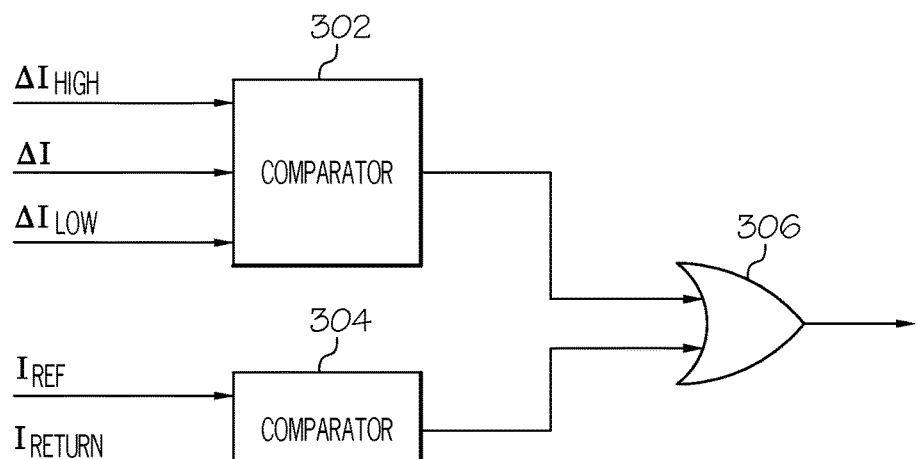
Figure 6:
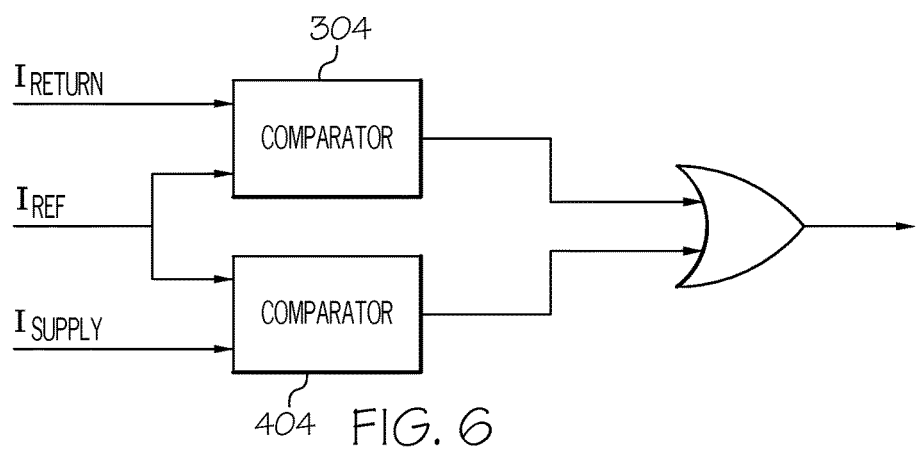

It will be appreciated that the fault detection logic 106 depicted in FIG. 3 is merely exemplary of one embodiment, and that it may be variously configured in other embodiments. Some exemplary alternative embodiments are depicted in FIGS. 4-6. In these alternative embodiments, those components that are identical to components in FIG. 3 are identified with like reference numerals and descriptions thereof are not further described.

As to the embodiment depicted in FIG. 4, it should be noted that when this alternative fault detection logic 106 is used, the non-isolated power supply 100 will additionally include a supply line current sensor 402 that is configured to sense supply line current and supply a signal representative thereof to the fault detection logic 106. The fault detection logic 106 is additionally configured to detect when the supply line current exceeds a predetermined supply line current value, and command the first and second semiconductor switches to operate in the OFF state upon detecting that the supply line current exceeds the predetermined supply line current value. To do so, the fault detection logic 106 depicted in FIG. 4 additionally includes a third comparator 404 configured to detect when the supply line current exceeds the predetermined supply return current value 406 and supply a third output signal 408 representative thereof. In particular, the third comparator 404 is preferably configured such that the third output signal 408 is a logic LOW when the supply line current does not exceed the predetermined supply line current value 406, and is a logic HIGH when the supply line current exceeds the predetermined supply current value 406.

Similar to the embodiment depicted in FIG. 3, the OR-logic 306 is coupled to the first and second comparators 302, 304, but is additionally coupled to the third comparator 404. The OR-logic 306 is configured, upon receipt of one or more of the first, second, and third output signals at a logic HIGH state, to command the first and second semiconductor switches 116, 118 to operate in the OFF state.

In the embodiment depicted in FIG. 5, first comparator 302 is configured to compare the differential current to a reference high current and a reference low current instead of a single differential current magnitude. And in the embodiment depicted in FIG. 6, the differential current is not sensed at all.

The circuit topologies described herein detect output-to-chassis shorts in a non-isolated power supply, and protect the non-isolated power supply from the detected short to prevent damage to the semiconductor switches and/or other components within the power supply.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A circuit, comprising:
a non-isolated power supply configured to receive an input voltage and supply an output voltage, the non-isolated power supply including a boost converter, a buck stage converter, a supply line, a return line, a first semiconductor switch coupled in series with the supply line, and a second semiconductor switch coupled in series with the return line, the boost converter adapted to receive an input DC voltage and configured, upon receipt thereof, to supply a boosted DC voltage, buck stage converter coupled to receive the boosted DC voltage from the boost converter and configured, upon receipt thereof, to supply the output DC voltage, the first and second semiconductor switches each configured to operate in an ON state, in which electrical current flows through the first and second semiconductor switches, and an OFF state, in which electrical current does not flow through the first and second semiconductor switches;
a differential current sensor configured to sense differential current between the supply line and the return line; and
fault detection logic coupled to the differential current sensor, the first semiconductor switch, and the second semiconductor switch, the fault detection logic configured to:
detect when the differential current exceeds a predetermined current magnitude, and
command the first and second semiconductor switches to operate in the OFF state upon detecting that the differential current exceeds the predetermined current magnitude.

2. The circuit of claim 1, further comprising:
a return line current sensor configured to sense return line current,
wherein the fault detection logic is further configured to:
detect when return line current exceeds a predetermined current value, and
command the first and second semiconductor switches to operate in the OFF state upon detecting that the return line current exceeds the predetermined current value.

3. The circuit of claim 2, wherein:
the differential current sensor comprises a Hall sensor; and
the return line current sensor comprises a resistance coupled in series in the return line.

4. The circuit of claim 2, wherein the fault detection logic comprises:
a first comparator configured to detect when the differential current exceeds the predetermined current magnitude and supply a first output signal representative thereof; and
a second comparator configured to detect when the return line current exceeds the predetermined current value and supply a second output signal representative thereof.

5. The circuit of claim 4, wherein the fault detection logic further comprises:
OR-logic coupled to the first and second comparators, the OR-logic configured, upon receipt of one or both of the first and second output signals, to command the first and second semiconductor switches to operate in the OFF state.

6. The circuit of claim 1, wherein the first and second semiconductor switches each comprise a transistor.

7. The circuit of claim 1, wherein the buck stage converter comprises the first semiconductor switch.

8. The circuit of claim 1, further comprising:
a rectifier circuit adapted to receive an AC voltage and configured, upon receipt thereof, to supply the input DC voltage to the boost converter.

9. The circuit of claim 1, further comprising:
a supply line current sensor configured to sense supply line current; and
a return line current sensor configured to sense return line current,
wherein the fault detection logic is further configured to:
detect when supply line current exceeds a predetermined supply line current value, and detect when return line current exceeds a predetermined return line current value, and command the first and second semiconductor switches to operate in the OFF state upon detecting that (i) the supply line current exceeds the predetermined supply line current value or (ii) the return line current exceeds the predetermined return line current value.

10. The circuit of claim 9, wherein the fault detection logic comprises:
a first comparator configured to detect when the differential current exceeds the predetermined current magnitude and supply a first output signal representative thereof;
a second comparator configured to detect when the supply line current exceeds the predetermined supply line current value and supply a second output signal representative thereof; and
a third comparator configured to detect when the return line current exceeds the predetermined supply return current value and supply a third output signal representative thereof.

11. The circuit of claim 10, wherein the fault detection logic further comprises:
OR-logic coupled to the first, second, and third comparators, the OR-logic configured, upon receipt of one or more of the first, second, and third output signals, to command the first and second semiconductor switches to operate in the OFF state.

12. The circuit of claim 11, wherein:
the differential current sensor comprises a Hall sensor;
the supply line current sensor comprises a first resistance coupled in series in the supply line; and
the return line current sensor comprises a resistance coupled in series in the return line.

13. A non-isolated power supply, comprising:
a DC-DC converter adapted to receive an input DC voltage and supply an output DC voltage, the DC-DC converter including a boost stage, a buck stage, a supply line, a return line, a first semiconductor switch coupled in series with the supply line, and a second semiconductor switch coupled in series with the return line, the first and second semiconductor switches each configured to operate in an ON state, in which electrical current flows through the first and second semiconductor switches, and an OFF state, in which electrical current does not flow through the first and second semiconductor switches;
a differential current sensor configured to sense differential current between the supply line and the return line;
a return line current sensor configured to sense return line current; and
fault detection logic coupled to the differential current sensor, the return line current sensor, the first semiconductor switch, and the second semiconductor switch, the fault detection logic configured to:
detect when the differential current exceeds a predetermined current magnitude,
detect when return line current exceeds a predetermined return line current value, and
command the first and second semiconductor switches to operate in the OFF state upon detecting that (i) the differential current exceeds the predetermined current magnitude or (ii) the return line current exceeds the predetermined current value.

14. The non-isolated power supply of claim 13, wherein:
the differential current sensor comprises a Hall sensor; and
the return line current sensor comprises a resistance coupled in series in the return line.

15. The non-isolated power supply of claim 13, wherein the fault detection logic comprises:
a first comparator configured to detect when the differential current exceeds the predetermined current magnitude and supply a first output signal representative thereof; and
a second comparator configured to detect when the return line current exceeds the predetermined current value and supply a second output signal representative thereof.

16. The non-isolated power supply of claim 15, wherein the fault detection logic further comprises:
OR-logic coupled to the first and second comparators, the OR-logic configured, upon receipt of one or both of the first and second output signals, to command the first and second semiconductor switches to operate in the OFF state.

17. The non-isolated power supply of claim 13, wherein the first and second semiconductor switches each comprise a transistor.

18. The circuit of claim 13, wherein the buck stage comprises the first semiconductor switch.

19. A non-isolated power supply, comprising:
a DC-DC converter adapted to receive an input DC voltage and supply an output DC voltage, the DC-DC converter including a supply line, a return line, a first semiconductor switch coupled in series with the supply line, and a second semiconductor switch coupled in series with the return line, the first and second semiconductor switches each configured to operate in an ON state, in which electrical current flows through the first and second semiconductor switches, and an OFF state, in which electrical current does not flow through the first and second semiconductor switches;
a differential current sensor configured to sense differential current between the supply line and the return line, the differential current sensor comprising a Hall sensor;
a return line current sensor configured to sense return line current, the return line current sensor comprising a resistance coupled in series in the return line; and
fault detection logic coupled to the differential current sensor, the return line current sensor, the first semiconductor switch, and the second semiconductor switch, the fault detection logic comprising:
a first comparator configured to detect when the differential current exceeds a predetermined current magnitude and supply a first output signal representative thereof,
a second comparator configured to detect when the return line current exceeds the predetermined current value and supply a second output signal representative thereof, and
OR-logic coupled to the first and second comparators, the OR-logic configured, upon receipt of one or both of the first and second output signals, to command the first and second semiconductor switches to operate in the OFF state.

* * * * *